(12) United States Patent
Johar et al.

(10) Patent No.: US 12,248,084 B2
(45) Date of Patent: Mar. 11, 2025

(54) WAYFINDING AND LOCATION-BASED INFORMATION DELIVERY USING BLUETOOTH BEACONS

(71) Applicant: Capital One Services, LLC, McLean, VA (US)

(72) Inventors: Imren Johar, Clifton, VA (US); Ray Cheng, Long Island City, NY (US); Leeyat Bracha Tessler, Arlington, VA (US); Daniel Marsch, Sterling, VA (US); Rocky Guo, Vienna, VA (US); Bryant Yee, Washington, DC (US); John Jones, Alexandria, VA (US)

(73) Assignee: Capital One Services, LLC, McLean, VA (US)

( * ) Notice: Subject to any disclaimer, the term of this patent is extended or adjusted under 35 U.S.C. 154(b) by 421 days.

(21) Appl. No.: 17/812,533

(22) Filed: Jul. 14, 2022

(65) Prior Publication Data

US 2024/0019531 A1    Jan. 18, 2024

(51) Int. Cl.
| | |
|---|---|
| *G01S 5/02* | (2010.01) |
| *H04W 4/021* | (2018.01) |
| *H04W 4/33* | (2018.01) |
| *H04W 64/00* | (2009.01) |

(52) U.S. Cl.
CPC .......... *G01S 5/0289* (2013.01); *H04W 4/022* (2013.01); *H04W 4/33* (2018.02); *H04W 64/003* (2013.01)

(58) Field of Classification Search
CPC ........ G01S 5/0289; G01S 5/14; G01S 5/0295; H04W 4/022; H04W 4/33; H04W 64/003; H04W 4/021; H04W 4/80

USPC ..................................................... 455/456.1
See application file for complete search history.

(56) References Cited

U.S. PATENT DOCUMENTS

| | | | |
|---|---|---|---|
| 9,591,570 B2 * | 3/2017 | Kubo | H04W 4/80 |
| 10,748,546 B2 | 8/2020 | Kim et al. | |
| 2017/0280298 A1 * | 9/2017 | Mycek | H04W 4/023 |
| 2019/0124474 A1 * | 4/2019 | Bloechl | H04W 24/10 |

FOREIGN PATENT DOCUMENTS

CN    108293069 A  *  7/2018  ........... H04B 17/318

* cited by examiner

*Primary Examiner* — Tanmay K Shah
(74) *Attorney, Agent, or Firm* — Harrity & Harrity, LLP

(57) ABSTRACT

In some implementations, a user device may receive one or more first advertisements from one or more first beacons. Accordingly, the user device may exchange check-in messages with a remote device based on the one or more first advertisements. The user device may track a location using at least one or more signal strengths associated with the one or more first beacons and one or more signal strengths associated with one or more second beacons. The user device may further display and update a map based on tracking the location. The user device may receive one or more second advertisements from the one or more second beacons. Accordingly, the user device may request first information associated with the one or more second beacons that is different from second information associated with one or more third beacons. The user device may further display the first information.

20 Claims, 16 Drawing Sheets

WAYFINDING AND LOCATION-BASED INFORMATION DELIVERY USING BLUETOOTH BEACONS

BACKGROUND

Location-triggered actions are used on mobile devices to improve user experience. For example, global positioning system (GPS) information may be used to determine mobile device locations with accuracy of approximately 5-15 meters. Accordingly, applications executed on a mobile device may use GPS data to trigger events.

SUMMARY

Some implementations described herein relate to a system for beacon-based wayfinding and location-based information delivery. The system may include one or more memories and one or more processors communicatively coupled to the one or more memories. The one or more processors may be configured to receive one or more first advertisements from one or more first beacons. The one or more processors may be configured to exchange check-in messages with a remote device based on the one or more first advertisements. The one or more processors may be configured to track a location using at least one or more signal strengths associated with the one or more first beacons and one or more signal strengths associated with one or more second beacons. The one or more processors may be configured to display and update a map based on tracking the location. The one or more processors may be configured to receive one or more second advertisements from the one or more second beacons. The one or more processors may be configured to request first information associated with the one or more second beacons that is different from second information associated with one or more third beacons. The one or more processors may be configured to display the first information.

Some implementations described herein relate to a method of beacon-based wayfinding and location-based information delivery. The method may include receiving one or more first advertisements from one or more first beacons. The method may include exchanging check-in messages with a remote device based on the one or more first advertisements. The method may include receiving one or more second advertisements from one or more second beacons. The method may include requesting first information associated with the one or more second beacons that is different from second information associated with one or more third beacons. The method may include displaying the first information.

Some implementations described herein relate to a non-transitory computer-readable medium that stores a set of instructions for beacon-based wayfinding and location-based information delivery for a device. The set of instructions, when executed by one or more processors of the device, may cause the device to receive one or more first advertisements from one or more first beacons. The set of instructions, when executed by one or more processors of the device, may cause the device to request first information associated with the one or more first beacons that is different from second information associated with one or more second beacons. The set of instructions, when executed by one or more processors of the device, may cause the device to display the first information. The set of instructions, when executed by one or more processors of the device, may cause the device to transmit a first location based on one or more signal strengths associated with the one or more first beacons. The set of instructions, when executed by one or more processors of the device, may cause the device to receive a check-in message from a remote device based on the first location. The set of instructions, when executed by one or more processors of the device, may cause the device to receive one or more second advertisements from the one or more second beacons. The set of instructions, when executed by one or more processors of the device, may cause the device to request the second information associated with the one or more second beacons, based on a second location based on one or more signal strengths associated with the one or more second beacons. The set of instructions, when executed by one or more processors of the device, may cause the device to display the second information.

DETAILED DESCRIPTION

The following detailed description of example implementations refers to the accompanying drawings. The same reference numbers in different drawings may identify the same or similar elements.

Mobile devices can use global navigation satellite system (GNSS) information to trigger actions by mobile application. Generally, GNSS information may be used to determine mobile device locations with an accuracy of approximately 5-15 meters, but this accuracy decreases within buildings and other areas with poor line-of-sight to satellites. Accordingly, mobile devices may waste processing resources and power, as well as suffer large latency, when GNSS errors cause mobile application actions to be delayed (or triggered too early).

Some implementations described herein provide for using beacons (e.g., Bluetooth® Low Energy (BLE) beacons encoding Bluetooth advertisements) to trigger mobile application actions. By using beacons, accuracy is increased (e.g., within 5 meters or less) in order to conserve processing resources and power, as well as reduce latency, when triggering the actions by the mobile application. In examples described herein, the beacons may be used for wayfinding (e.g., within a building or another type of area with poor line-of-sight to satellites). Wayfinding using the beacons is more accurate, as well as less power- and processing-heavy, as compared with wayfinding using GNSS. Additionally, in examples described herein, the beacons may be used for location-based information delivery. The information delivered is more relevant because the beacons are more accurate as compared with GNSS, and delivering the information based on the beacons consumes less power and fewer processing resources as compared with delivering the information based on GNSS.

FIGS. 1A-1G are diagrams of an example 100 associated with wayfinding and location-based information delivery using Bluetooth beacons. As shown in FIGS. 1A-1G, example 100 includes a control device, a plurality of BLE sensors, a user device, and a remote server. These devices are described in more detail in connection with FIGS. 5 and 6.

Figure 1A:
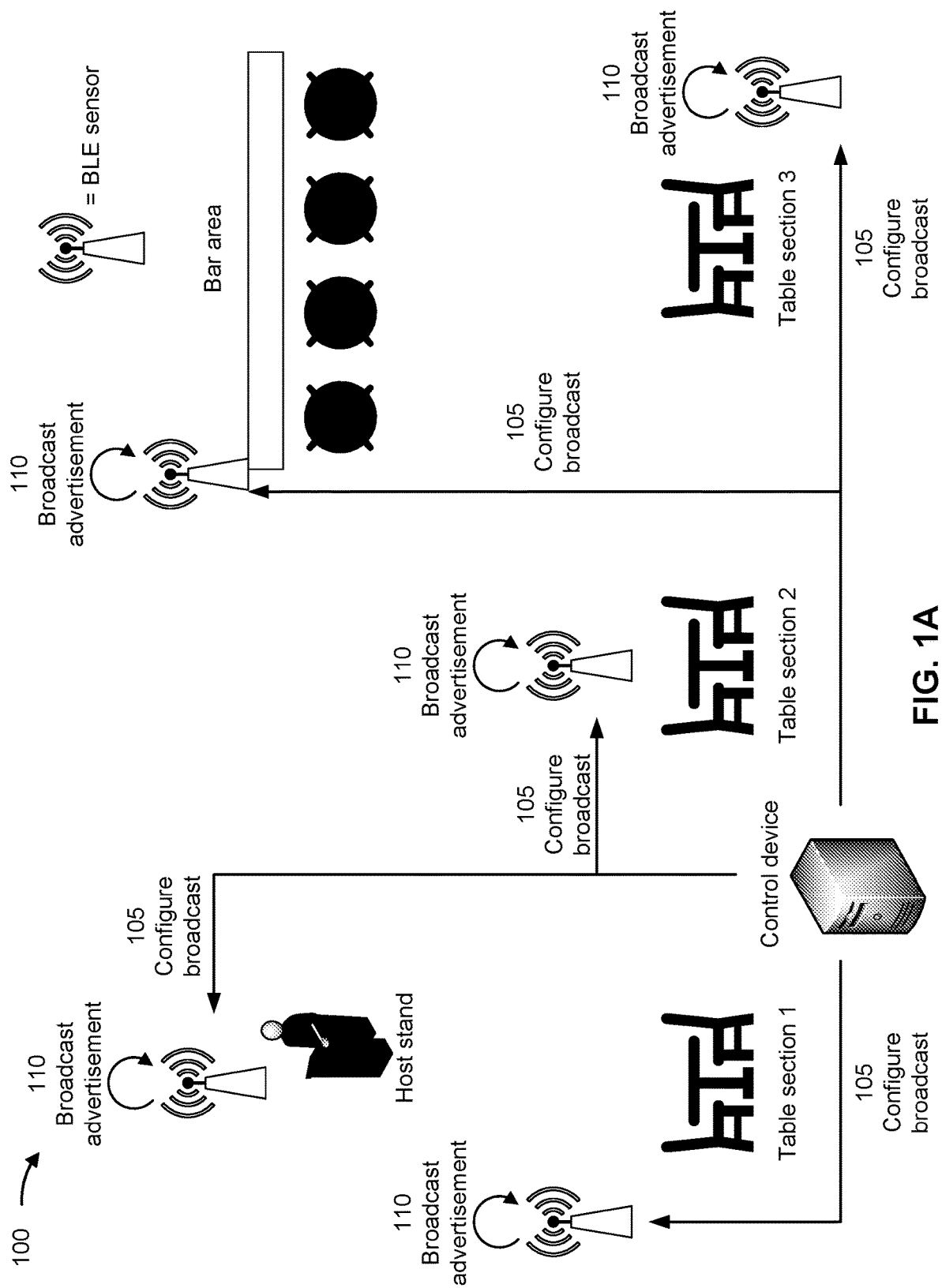
FIGS. 1A-1G are diagrams of an example implementation relating to wayfinding and location-based information delivery using Bluetooth® beacons, in accordance with some embodiments of the present disclosure.

As shown in FIG. 1A, a plurality of BLE sensors are distributed within an area (e.g., a building, a cluster of buildings, and/or an outdoor plot). As used herein, "area" refers to a three-dimensional volume, such as a volume of a building or of an outdoor plot up to a certain height. In some implementations, the area may be associated with poor line-of-sight to satellites (e.g., as determined by a measurement, such as a reference signal received power (RSRP) value, satisfying a poor line-of-sight threshold).

As further shown in FIG. 1A, each BLE sensor may be associated with (e.g., located in or within a distance, that satisfies a distance threshold, of) a corresponding region of the area. As used herein, "region" may refer to a two-dimensional zone (e.g., defined as a specific portion of the floor of a building or of the ground in an outdoor plot) or to a three-dimensional zone (e.g., defined as a specific volume of a building or of an outdoor plot up to a certain height). In example 100, one BLE sensor is associated with a host stand (e.g., for a restaurant), one BLE sensor is associated with a first table section, one BLE sensor is associated with a second table section, one BLE sensor is associated with a third table section, and one BLE sensor is associated with a bar area. Although shown with one BLE sensor associated with each region, other implementations may include a plurality of BLE sensors associated with a region (e.g., one or more regions). Additionally, or alternatively, other implementations may include additional regions (e.g., a region associated with a bathroom or a region associated with a kitchen, among other examples) and/or omit regions shown in FIG. 1A (e.g., only having one or two table sections, not having a bar area, or not having a host stand, among other examples).

Although FIGS. 1A-1G are described in connection with a restaurant, other settings may be used. For example, a plurality of BLE sensors may be distributed throughout a hotel (e.g., with one or more BLE sensors associated with a front desk, one or more BLE sensors associated with a pool, one or more BLE sensors associated with a ballroom, one or more BLE sensors associated with an elevator, and/or one or more BLE sensors associated with each section of rooms, among other examples). In another example, a plurality of BLE sensors may be distributed throughout a mall (e.g., with one or more BLE sensors associated with each entrance, one or more BLE sensors associated with a food court, one or more BLE sensors associated with an escalator, and/or one or more BLE sensors associated with each store, among other examples).

As shown by reference number 105, a control device may transmit, and each BLE sensor may receive, a corresponding configuration to broadcast. For example, the configuration may include a unique BLE identifier (BLE ID) (or at least a quasi-unique BLE ID, such as a BLE ID unique within the area of example implementation 100) for each BLE sensor to include in a Bluetooth advertisement to be broadcast. In some implementations, each configuration may additionally include a uniform resource locator (URL) and/or another type of payload to include in the Bluetooth advertisement to be broadcast.

Accordingly, as shown by reference number 110, the BLE sensors may begin broadcasting Bluetooth advertisements according to the corresponding configurations from the control device. In some implementations, the control device may configure the BLE sensors to broadcast only during certain time windows (e.g., on certain days and/or during certain hours, such as operating days and/or hours, respectively, of the restaurant). The control device may transmit a time configuration to the BLE sensors indicating when to broadcast (and/or when not to broadcast). Alternatively, the control device may transmit instructions to start broadcasting, and instructions to stop broadcasting, to the BLE sensors according to a time configuration.

Figure 1B:
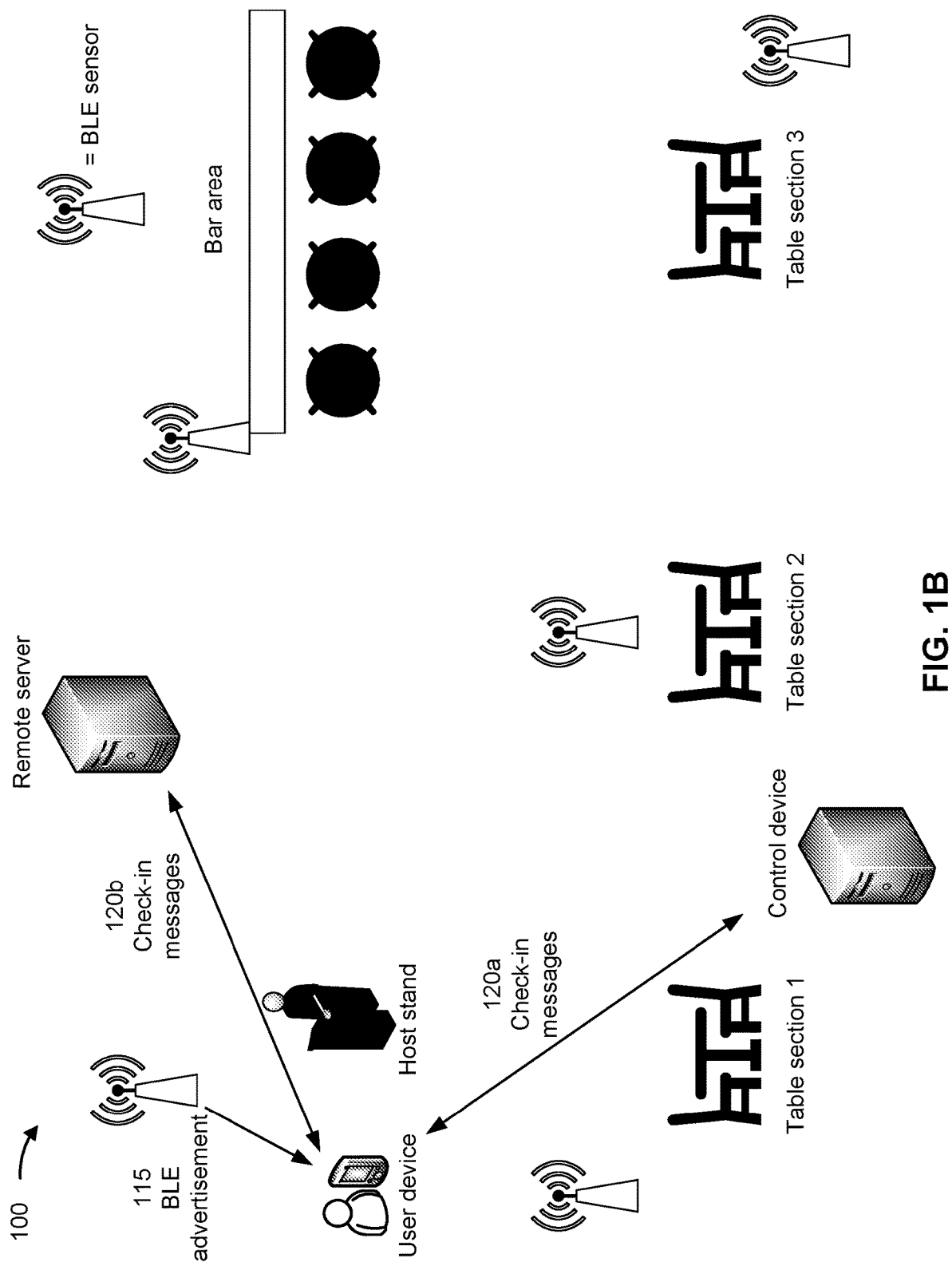

As shown in FIG. 1B and by reference number 115, the user device may receive a first advertisement (e.g., one or more first advertisements) from a first beacon associated with the host stand (e.g., one or more first beacons). For example, the BLE sensor associated with the host stand may broadcast a Bluetooth advertisement that is received by the user device. Based on a data structure stored on the user device (e.g., from a registration procedure as described in connection with FIGS. 2A-2B), the user device may determine to initiate a check-in process. For example, the user device may map, using the stored data structure, a BLE ID included in the Bluetooth advertisement to an indication to initiate the check-in process.

Additionally, or alternatively, the Bluetooth advertisement may include a payload that is used to initiate the check-in process. For example, the payload may include data to transmit to the control device and/or the remote server to initiate the check-in process (e.g., as described in connection with reference numbers 120a and 120b). Additionally, or alternatively, the payload may include a URL (and/or another locator) that is used to navigate to a webpage (e.g., using a mobile browser executed on the user device), where a user may input information to continue the check-in process (e.g., by interacting with a confirmation button of the webpage and/or entering information into drop-down boxes, text boxes, radio buttons, and/or other form fields of the webpage). In some implementations, the user device may launch a browser plug-in within a mobile application configured to navigate to the webpage using the URL.

In order to prevent spam advertisement, the user device (e.g., at the mobile application level and/or at an operating system (OS) level) may be configured to discard advertisements whenever BLE IDs (or other similar identifiers), associated with BLE sensors (or other similar beacons) broadcasting the advertisements, are not included in the stored data structure. Accordingly, the user device will only perform actions based on advertisements including BLE IDs that were registered in advance (e.g., as described in connection with FIGS. 3A-3B). Additionally, the user device will not decode payloads of advertisements including BLE IDs that are not included in the stored data structure, which conserves power and processing resources at the user device.

As shown by reference number 120a, the user device may exchange check-in messages with the control device based on the first advertisement. For example, the user device may determine a signal strength (e.g., one or more signal strengths) associated with the first advertisement and exchange the check-in messages when the signal strength satisfies a strength threshold (e.g., one or more strength thresholds). For example, the user device may exchange the check-in messages when an RSRP associated with the first advertisement satisfies the strength threshold. The strength threshold may be configured during a registration procedure (e.g., as described in connection with FIGS. 2A-2B) or may be programmed (and/or otherwise preconfigured) into the user device (e.g., with the mobile application described above). By exchanging check-in messages with the control device, the user device may conserve power and processing resources because the control device is on-site at the restaurant. Similarly, the user device may conserve power and processing resources when exchanging check-in messages with a remote device that is an on-site computing system.

Alternatively, as shown by reference number 120b, the user device may exchange check-in messages with the remote server based on the first advertisement. For example, the user device may access the remote server through an application layer of the user device. By exchanging check-in messages with the remote server, the check-in procedure may be updated without consuming power and processing resources at the control device to update the check-in procedure.

In some implementations, exchanging check-in messages may include transmitting an initial location, associated with the user, based on the signal strength associated with the first beacon and receiving a confirmation indicating that the user may proceed. For example, the user device may estimate a distance between the user device and the first beacon (e.g., based on time-of-flight and incident direction for the Bluetooth advertisement broadcast by the first beacon and/or based on trilateration, multilateration, or triangulation using the Bluetooth advertisement broadcast by the first beacon and additional Bluetooth advertisements broadcast by nearby beacons) and transmit the distance as the initial location. In some implementations, as described above, the initial location may be transmitted based on user interaction with a webpage opened in response to receiving the Bluetooth advertisement broadcast by the first beacon.

Based on transmitting the initial location the, the user device may receive a confirmation to proceed to a second location (e.g., to a table section to which the user is assigned). Accordingly, the user device may display an indication that the user can proceed to an assigned table. Therefore, the user device may proceed as described in connection with FIG. 1E.

Alternatively, the user device may receive an instruction to proceed to a third location before receiving the confirmation (e.g., to a bar section because no tables are available or to allow the user to wait for the assigned table to be available). Accordingly, the user device may display an indication that the user should go to the bar while waiting for a table. Therefore, the user device may proceed as described in connection with FIG. 1F.

Figure 1C:
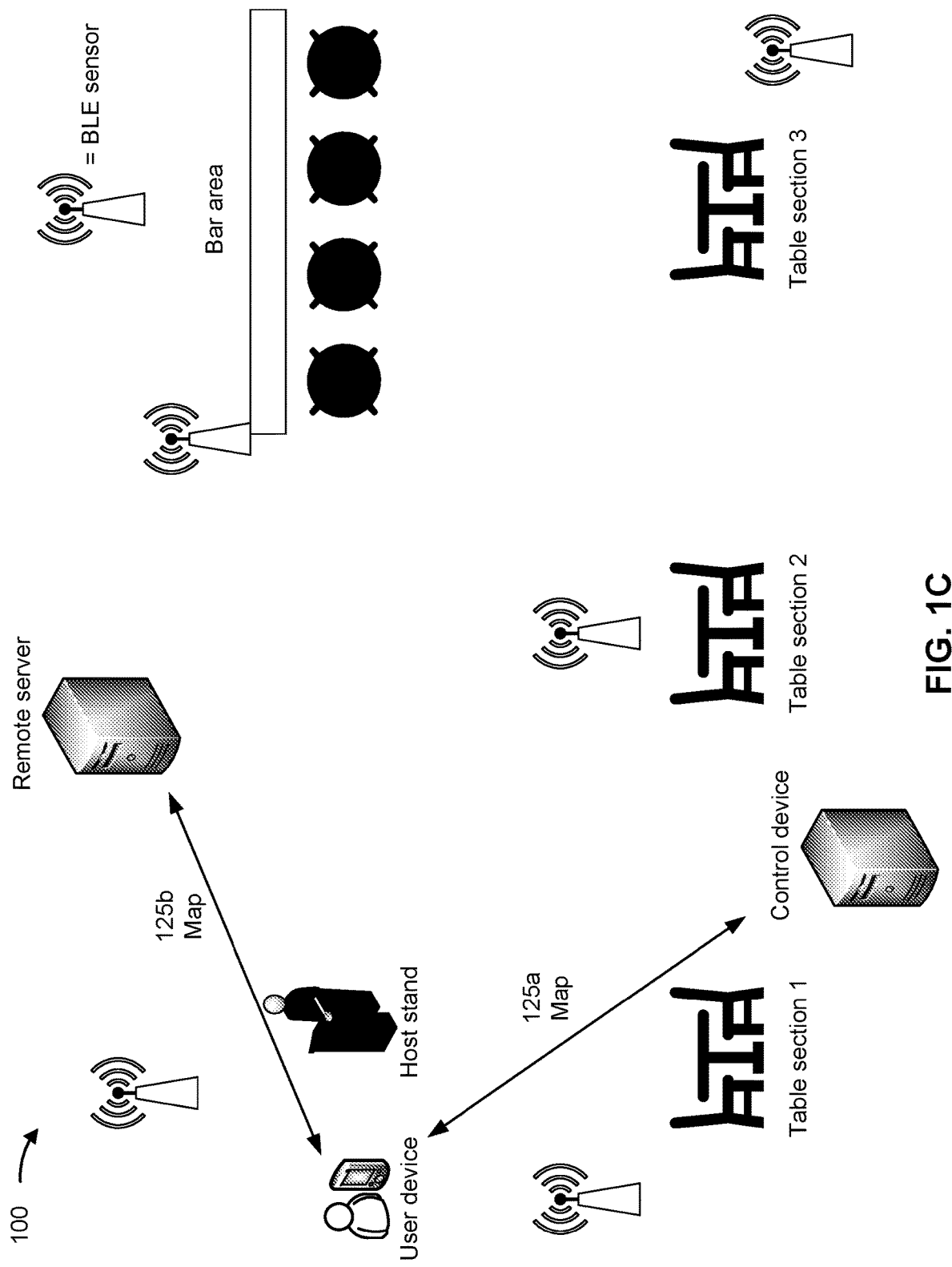

As shown in FIG. 1C and by reference number 125a, the user device may receive a map (or another similar data structure) of the restaurant from the control device based on the check-in procedure. Accordingly, the user device may display the map (and may also display a visual indicator of the user on the map based on the initial location described above). By receiving the map from the control device, the user device may conserve power and processing resources because the control device is on-site at the restaurant. Similarly, the user device may conserve power and processing resources when receiving the map from a remote device that is an on-site computing system.

Alternatively, as shown by reference number 125b, the user device may receive the map from the remote server based on the check-in procedure. Accordingly, the user device may display the map (and may also display a visual indicator of the user on the map based on the initial location described above). For example, the user device may access the remote server through an application layer of the user device. By the user device receiving the map from the remote server, the map may be updated without consuming power and processing resources at the control device to update the map.

Figure 1D:
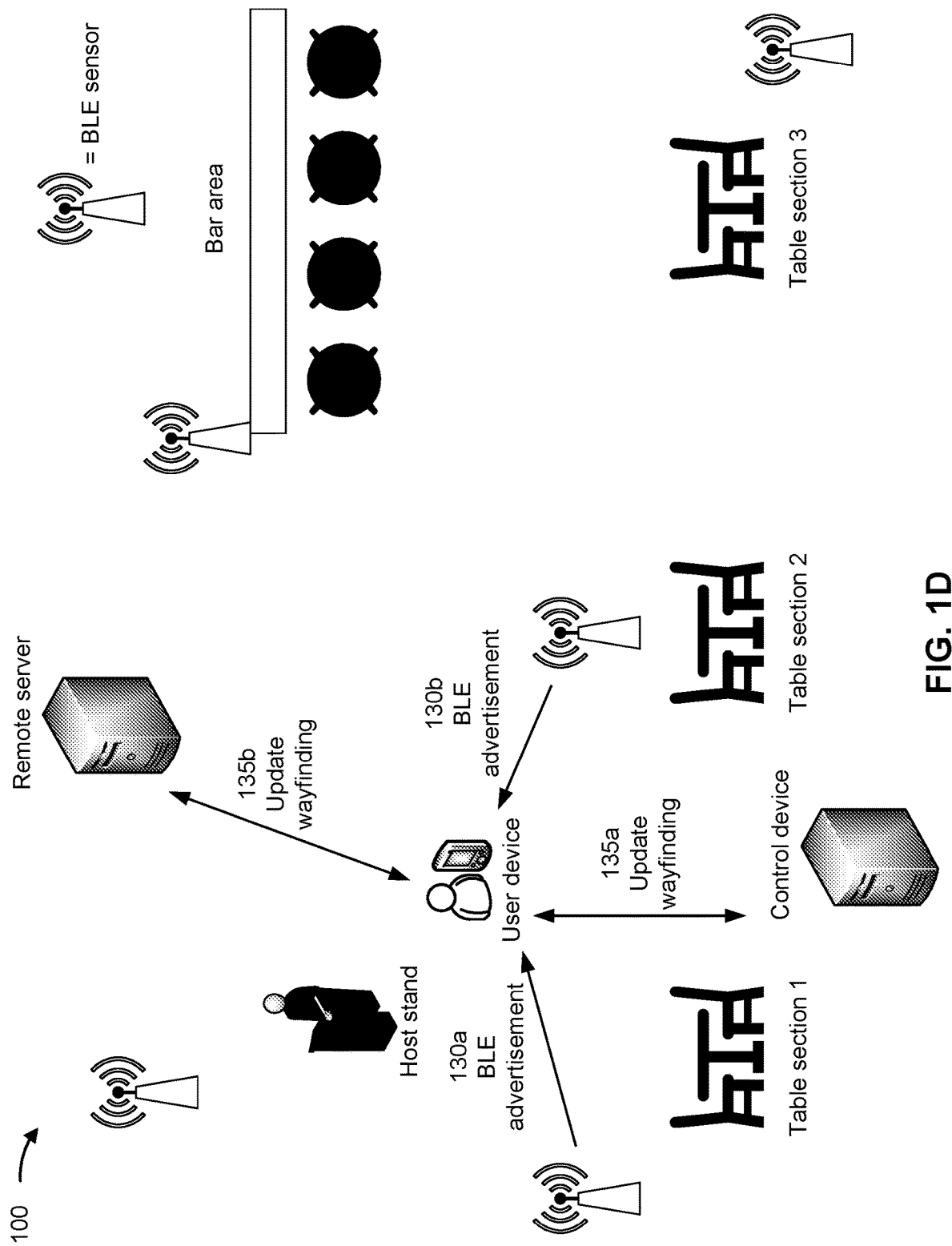

As shown in FIG. 1D, the user device may track a location using signal strengths (e.g., at least one or more signal strengths) associated with beacons (e.g., at least the first beacon and a second beacon, such as one or more second beacons) of the restaurant. In example implementation 100 and as shown by reference numbers 130a and 130b, the user device uses Bluetooth advertisements from a beacon associated with the first table section and from a beacon associated with the second table section to wayfind through the restaurant. Accordingly, the user device may periodically determine RSRPs (and/or other measures of signal strength) associated with at least some of the BLE sensors in order to periodically update the location of the user device (e.g., based on times-of-flight and incident directions for the Bluetooth advertisements broadcast by the BLE sensors and/or based on trilateration, multilateration, or triangulation using the Bluetooth advertisements broadcast by the BLE sensors). Accordingly, the user device can update the displayed map based on tracking the location. For example, the user device may shift a focal point of the displayed map to follow a direction of the user device. Additionally, or alternatively, the user device may move the visual indicator of the user on the map (described above) as the location is updated.

In some implementations, as shown by reference number 135a, the user device may communicate with the control device to wayfind through the restaurant. For example, the user device may receive new portions of the map from the control device as the focal point of the displayed map shifts and/or may transmit indications, as the location is updated, to the control device. By communicating with the control device, the user device may conserve power and processing resources because the control device is on-site at the restaurant. Similarly, the user device may conserve power and processing resources when communicating with a remote device that is an on-site computing system.

Alternatively, as shown by reference number 135b, the user device may communicate with the remote server to wayfind through the restaurant. For example, the user device may receive new portions of the map from the remote server as the focal point of the displayed map shifts and/or may transmit indications, as the location is updated, to the remote server. The user device may access the remote server through an application layer of the user device. By the user device receiving the map from the remote server, the map may be updated without consuming power and processing resources at the control device to update the map.

Figure 1E:
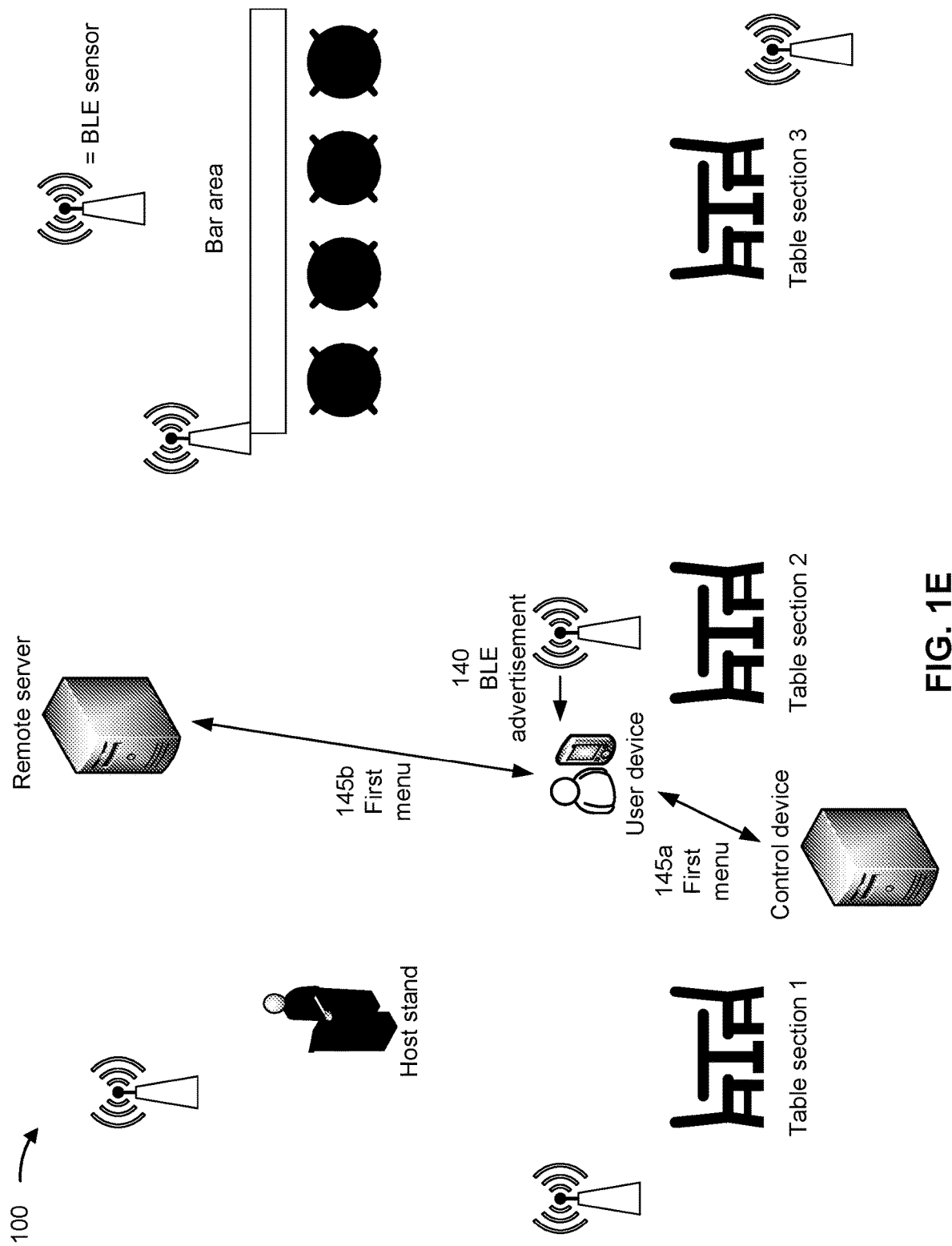

As shown in FIG. 1E and by reference number 140, the user device may receive a second advertisement (e.g., one or more second advertisements) from a second beacon associated with the second table section (e.g., one or more second beacons). For example, the BLE sensor associated with the second table section may broadcast a Bluetooth advertisement that is received by the user device. Based on a data structure stored on the user device (e.g., from a registration procedure as described in connection with FIGS. 2A-2B), the user device may determine to request information associated with the second beacon. For example, the user device may map, using the stored data structure, a BLE ID included in the Bluetooth advertisement to an indication to request the information associated with the second beacon.

Additionally, or alternatively, the Bluetooth advertisement may include a payload that is used to obtain the information associated with the second beacon. For example, the payload may include data to transmit to the control device and/or the remote server to receive the information associated with the second beacon (e.g., as described in connection with reference numbers 145*a* and 145*b*). Additionally, or alternatively, the payload may include a URL (and/or another locator) that is used to navigate to a webpage (e.g., using a mobile browser executed on the user device) including the information associated with the second beacon. In some implementations, the user device may launch a browser plug-in within a mobile application configured to navigate to the webpage using the URL.

As shown by reference number 145*a*, the user device may request the information associated with the second beacon from the control device based on the second advertisement. For example, the user device may determine a signal strength (e.g., one or more signal strengths) associated with the second advertisement and transmit a request for the information associated with the second beacon when the signal strength satisfies a strength threshold (e.g., one or more strength thresholds). For example, the user device may request the information associated with the second beacon when an RSRP associated with the second advertisement satisfies the strength threshold. The strength threshold may be configured during a registration procedure (e.g., as described in connection with FIGS. 2A-2B) or may be programmed (and/or otherwise preconfigured) into the user device (e.g., with the mobile application described above). By receiving the information associated with the second beacon from the control device, the user device may conserve power and processing resources because the control device is on-site at the restaurant. Similarly, the user device may conserve power and processing resources when receiving the information associated with the second beacon with a remote device that is an on-site computing system.

Alternatively, as shown by reference number 145*b*, the user device may request the information associated with the second beacon from the remote server based on the second advertisement. For example, the user device may access the remote server through an application layer of the user device. By the user device receiving the information associated with the second beacon from the remote server, the information associated with the second beacon may be updated without consuming power and processing resources at the control device to update the information associated with the second beacon.

Figure 1F:
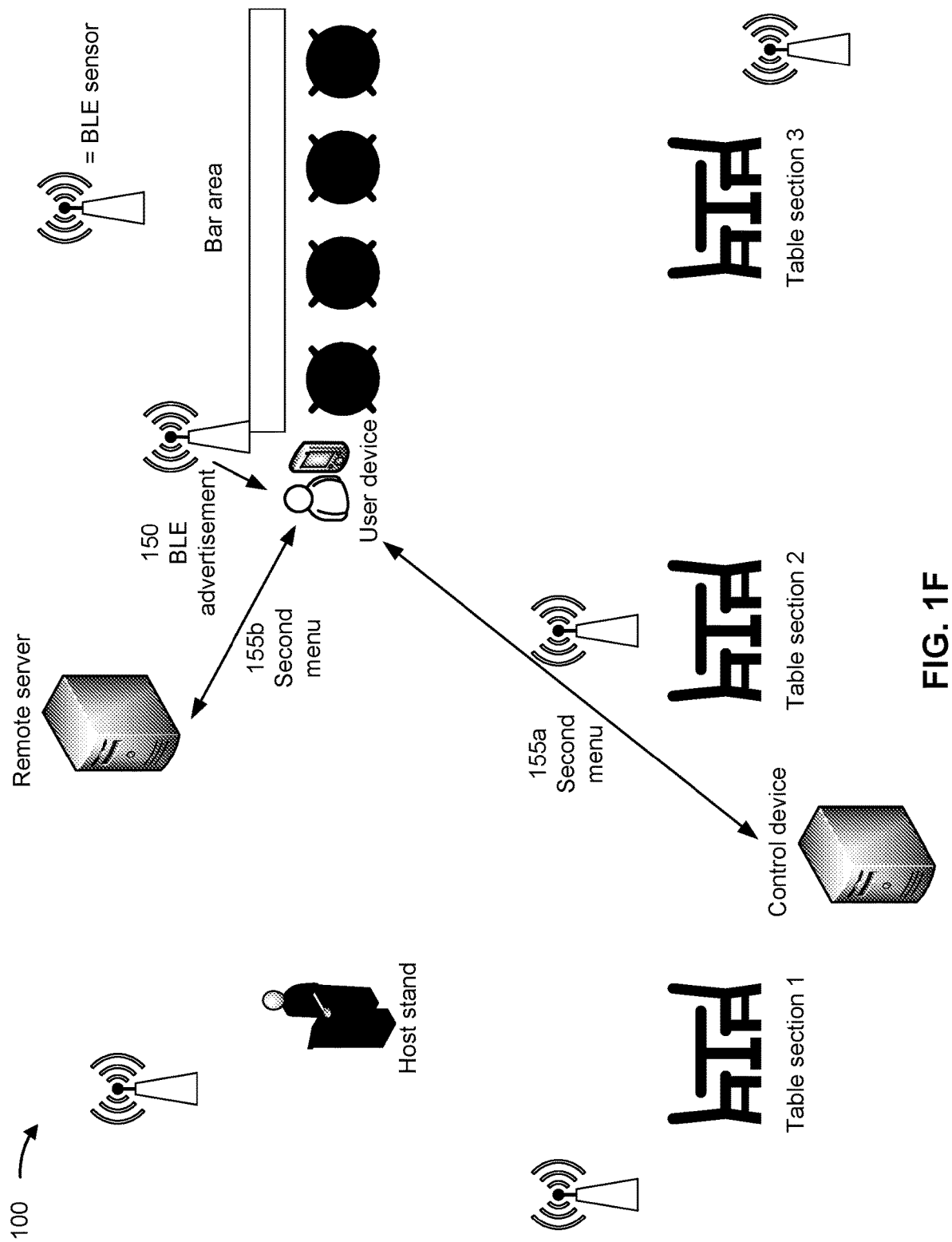

Similarly, as shown in FIG. 1F and by reference number 150, the user device may receive a third advertisement (e.g., one or more third advertisements) from a third beacon associated with the bar area (e.g., one or more third beacons). For example, the BLE sensor associated with the bar area may broadcast a Bluetooth advertisement that is received by the user device. Based on a data structure stored on the user device (e.g., from a registration procedure as described in connection with FIGS. 2A-2B), the user device may determine to request information associated with the third beacon. For example, the user device may map, using the stored data structure, a BLE ID included in the Bluetooth advertisement to an indication to request the information associated with the third beacon.

Additionally, or alternatively, the Bluetooth advertisement may include a payload that is used to obtain the information associated with the third beacon. For example, the payload may include data to transmit to the control device and/or the remote server to receive the information associated with the third beacon (e.g., as described in connection with reference numbers 155*a* and 155*b*). Additionally, or alternatively, the payload may include a URL (and/or another locator) that is used to navigate to a webpage (e.g., using a mobile browser executed on the user device) including the information associated with the third beacon. In some implementations, the user device may launch a browser plug-in within a mobile application configured to navigate to the webpage using the URL.

As shown by reference number 155*a*, the user device may request the information associated with the third beacon from the control device based on the third advertisement. For example, the user device may determine a signal strength (e.g., one or more signal strengths) associated with the third advertisement and transmit a request for the information associated with the third beacon when the signal strength satisfies a strength threshold (e.g., one or more strength thresholds). For example, the user device may request the information associated with the third beacon when an RSRP associated with the third advertisement satisfies the strength threshold. The strength threshold may be configured during a registration procedure (e.g., as described in connection with FIGS. 2A-2B) or may be programmed (and/or otherwise preconfigured) into the user device (e.g., with the mobile application described above). By receiving the information associated with the third beacon from the control device, the user device may conserve power and processing resources because the control device is on-site at the restaurant. Similarly, the user device may conserve power and processing resources when receiving the information associated with the third beacon with a remote device that is an on-site computing system.

Alternatively, as shown by reference number 155*b*, the user device may request the information associated with the third beacon from the remote server based on the third advertisement. For example, the user device may access the remote server through an application layer of the user device. By receiving the information associated with the third beacon from the remote server, the information associated with the second beacon may be updated without consuming power and processing resources at the control device to update the information associated with the third beacon.

The information associated with the second beacon may be a first list of items (e.g., one or more items) associated with a first region (e.g., a table menu in example implementation 100). Accordingly, the information associated with the third beacon may be a second list of items (e.g., one or more items) associated with a second region (e.g., a bar menu in example implementation 100). Other implementations may include additional lists associated with additional regions (e.g., an event menu associated with an event space, a dessert menu associated with a dessert cart, and/or a to-go menu associated with a carryout window, among other examples).

Accordingly, the user device may display the information corresponding to the beacons in the region in which the user device is located. Additionally, the user device may transmit (e.g., to the control device and/or the remote server) a selection of items from the corresponding information.

In some implementations, the user device may move between regions. For example, the user may begin at the bar area and select items from the information associated with the third beacon before proceeding to an assigned table and selecting items from the information associated with the second beacon. In some implementations, the user device may perform a transaction based on the selected items at the bar area (e.g., as described in connection with FIG. 1G) and then perform a transaction based on the selected items at the assigned table. Alternatively, the user device may perform a single transaction based on the selected items at the bar area and based on the selected items at the assigned table. Accordingly, the user device may perform a transaction based on information associated with multiple regions.

Figure 1G:
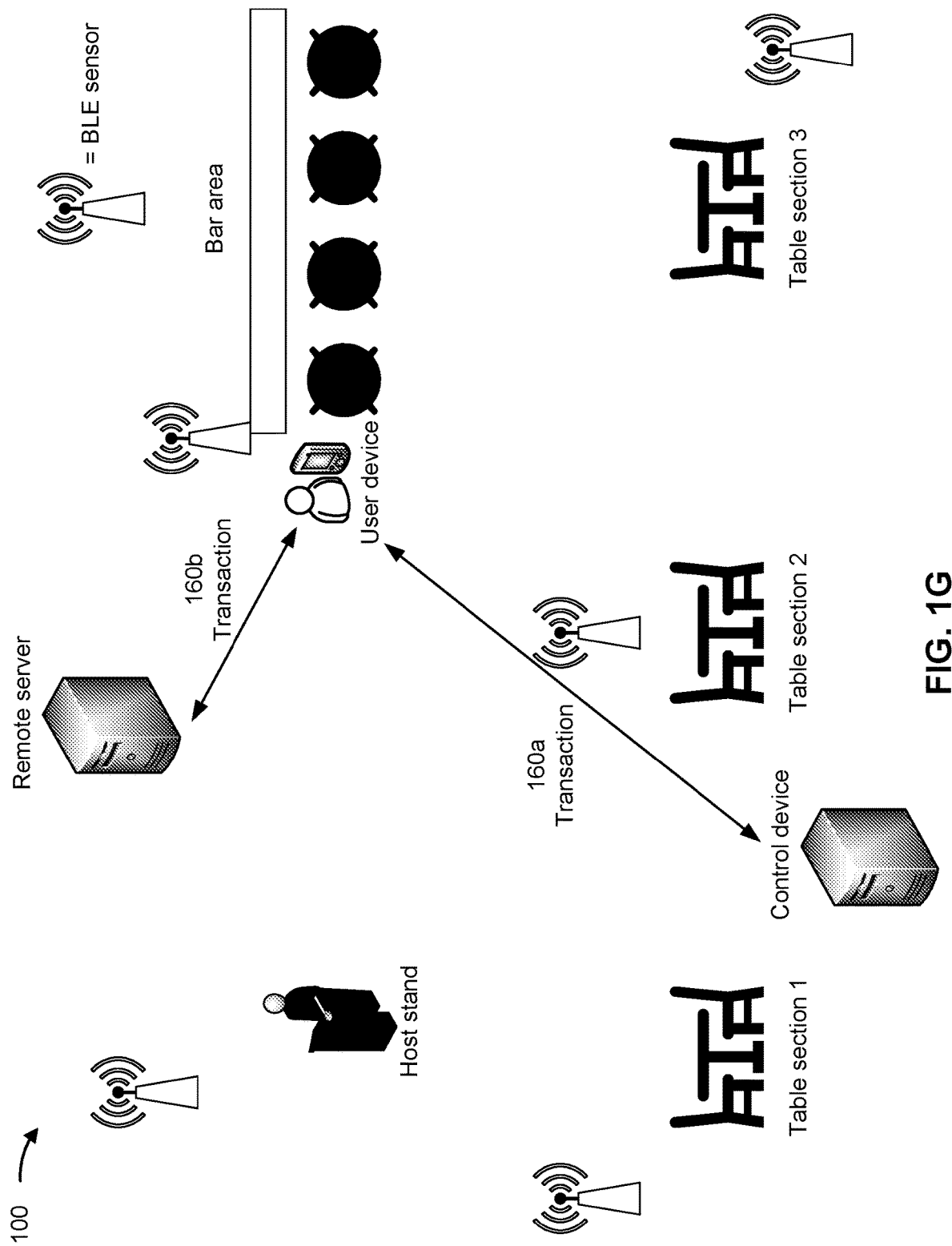

As shown in FIG. 1G and by reference number 160a, the user device may receive a summary of selected items from the control device and perform a transaction based on the summary. For example, the user device may transmit payment information (e.g., encrypted and/or over a secure connection) to the control device. The payment information may be programmed (and/or otherwise preconfigured) into the user device (e.g., with the mobile application described above) or may be entered by the user. By performing the transaction with the control device, the user device may conserve power and processing resources because the control device is on-site at the restaurant. Similarly, the user device may conserve power and processing resources when performing the transaction with a remote device that is an on-site computing system.

Alternatively, as shown in FIG. 1G and by reference number 160b, the user device may receive a summary of selected items from the remote server and perform a transaction based on the summary. For example, the user device may access the remote server through an application layer of the user device. By receiving the summary from the remote server, information used to generate the summary may be updated without consuming power and processing resources at the control device to update the information used to generate the summary.

By using techniques as described in connection with FIGS. 1A-1G, the user device uses beacons (e.g., BLE beacons encoding Bluetooth advertisements) to trigger actions. By using beacons, accuracy is increased (e.g., within 5 meters or less) in order to conserve processing resources and power, as well as reduce latency, when triggering the actions. In example implementation 100, the beacons are used for wayfinding (e.g., within the restaurant). Wayfinding using the beacons is more accurate, as well as less power- and processing-heavy, as compared with wayfinding using GNSS. Additionally, in example implementations 100, the beacons are used for location-based information delivery. The information delivered is more relevant because the beacons are more accurate as compared with GNSS, and delivering the information based on the beacons consumes less power and fewer processing resources as compared with delivering the information based on GNSS.

As indicated above, FIGS. 1A-1G are provided as an example. Other examples may differ from what is described with regard to FIGS. 1A-1G.

Figure 2A:
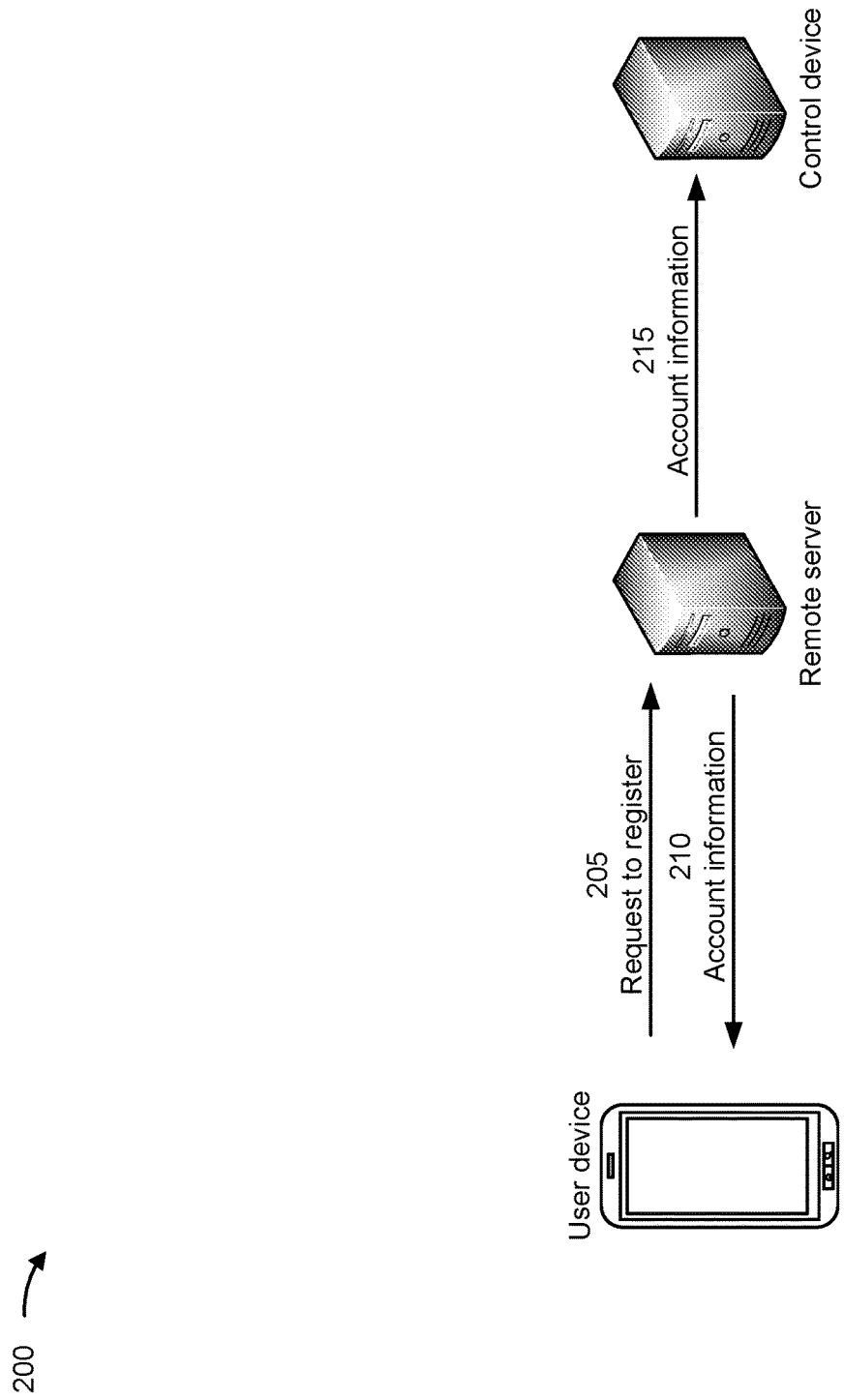
FIGS. 2A-2B are diagrams of an example implementation relating to user registration wayfinding and location-based information delivery using Bluetooth beacons, in accordance with some embodiments of the present disclosure.
Figure 2B:
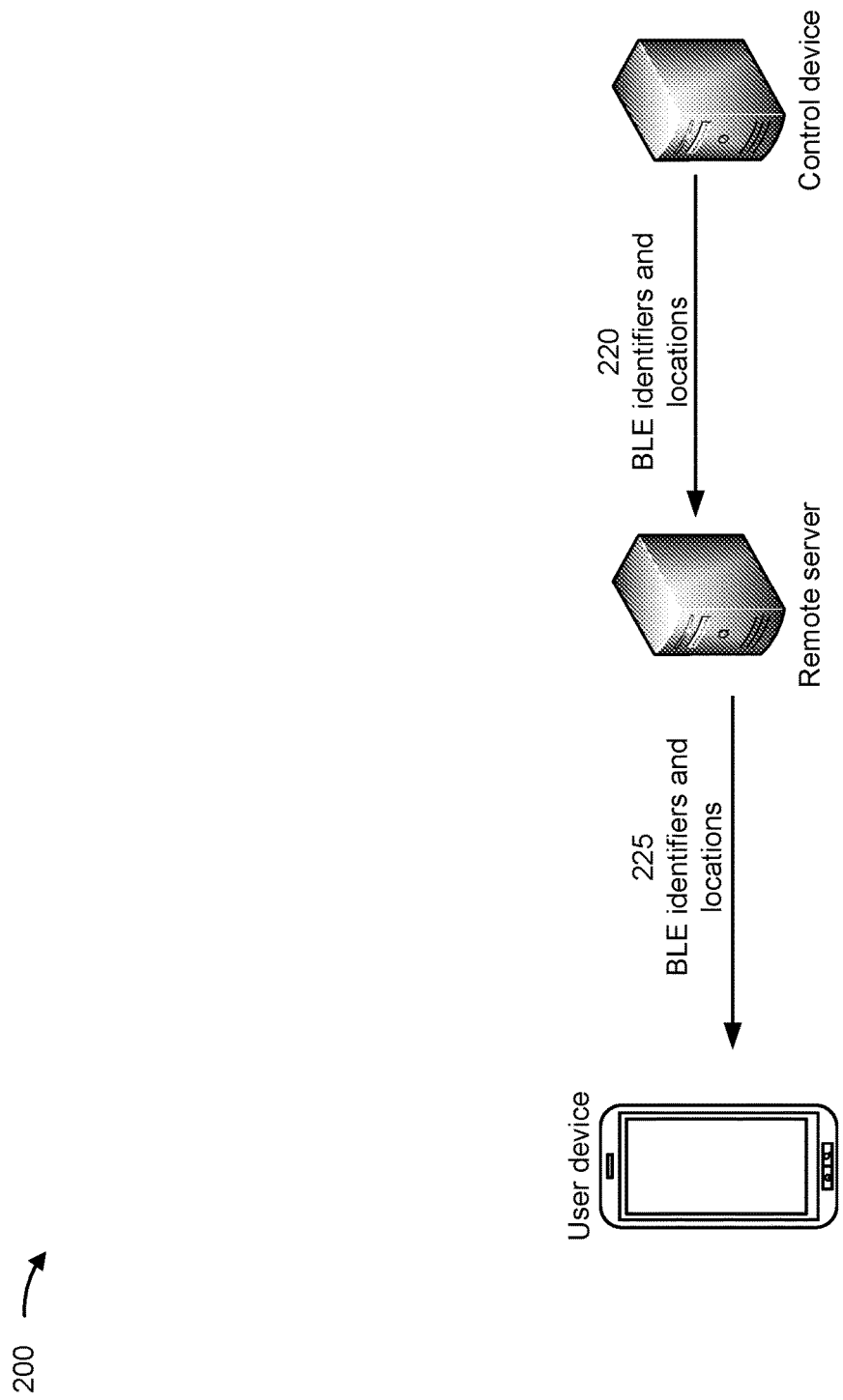

FIGS. 2A-2B are diagrams of an example 200 associated with user registration wayfinding and location-based information delivery using Bluetooth beacons. As shown in FIGS. 2A-2B, example 200 includes a control device, a user device, and a remote server. These devices are described in more detail in connection with FIGS. 5 and 6.

As shown in FIG. 2A and by reference number 205, the user device may transmit, and the remote server may receive, a registration message. For example, the user device may transmit a hypertext transfer protocol (HTTP) request, receive a webpage in response, and transmit the registration message as an HTTP request that includes information entered into form fields on the webpage. Additionally, or alternatively, the user device may transmit the registration message by performing an application programming interface (API) call with information that was entered by a user and/or stored on the user device as arguments (e.g., one or more arguments) to the API.

Accordingly, as shown by reference number 210, the remote server may transmit account information associated with the user to the user device. For example, the user device may receive the account information as an HTTP response and/or as a response from the API. The account information may include a name, a phone number, an email address, an account number, and/or additional information associated with the user. Additionally, in some implementations and as shown by reference number 215, the remote server may transmit the account information associated with the user to the control device. Accordingly, the control device may recognize the user device when performing wayfinding and/or location-based information delivery with the user device using beacons configured by the control device (e.g., as described in connection with FIGS. 1A-1G).

As shown in FIG. 2B and by reference number 220, the control device may transmit BLE IDs and locations (e.g., on a map or another similar data structure), corresponding to the BLE IDs, to the remote server. In some implementations, the remote server may have the BLE IDs and locations stored from a previous registration procedure with the control device (e.g., as described in connection with FIGS. 3A-3B). In addition to, or in lieu of, the locations, the control device may transmit event triggers, corresponding to the BLE IDs, to the remote server. For example, as described in connection with FIGS. 1A-1G, some BLE IDs may be associated with a check-in procedure while other BLE IDs may be associated with different information. Additionally, as shown by reference number 225, the remote server may transmit the BLE IDs and locations (and/or event triggers) to the user device. Accordingly, the user device may decode Bluetooth advertisements and trigger events (and/or measure Bluetooth advertisement signal strengths and track a location of the user device) using a locally stored data structure from the remote server. As a result, the user device may conserve power and processing resources when triggering events (and/or tracking the location of the user device).

As indicated above, FIGS. 2A-2B are provided as an example. Other examples may differ from what is described with regard to FIGS. 2A-2B.

Figure 3A:
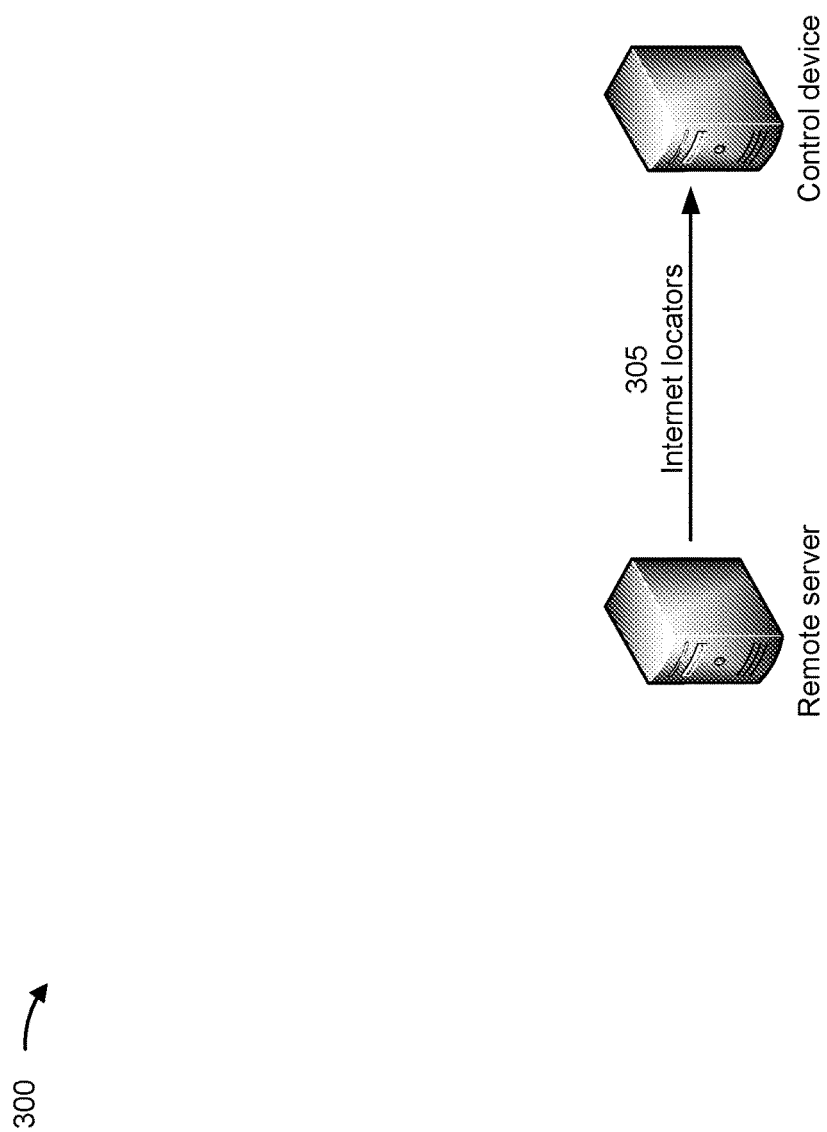
FIGS. 3A-3B are diagrams of an example implementation relating to provider registration wayfinding and location-based information delivery using Bluetooth beacons, in accordance with some embodiments of the present disclosure.
Figure 3B:
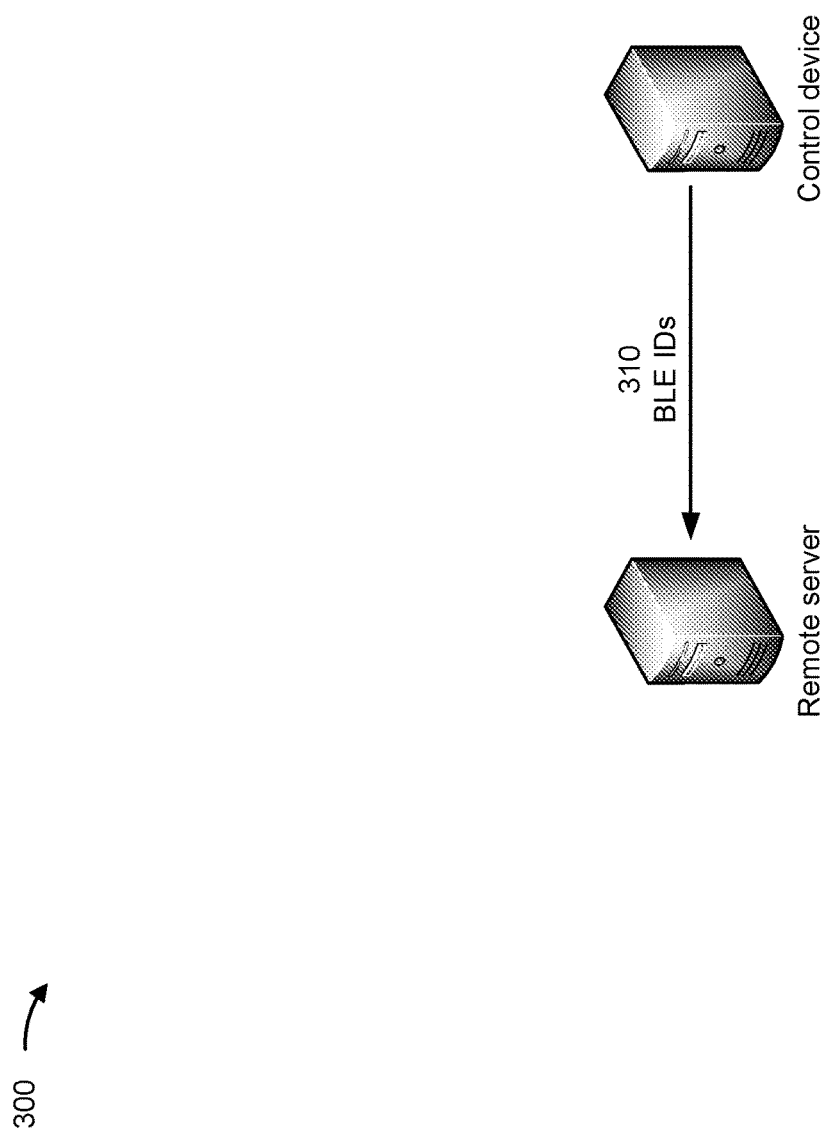

FIGS. 3A-3B are diagrams of an example 300 associated with provider registration wayfinding and location-based information delivery using Bluetooth beacons. As shown in FIGS. 3A-3B, example 300 includes a control device (e.g., associated with a provider using a set of BLE sensors) and a remote server. These devices are described in more detail in connection with FIGS. 5 and 6.

In example implementation 300, the remote server and the control device perform a registration procedure. For example, the control device may transmit an HTTP request, receive a webpage in response, and transmit a registration message as an HTTP request that includes information entered into form fields on the webpage. Additionally, or alternatively, the control device may transmit the registration message by performing an API call with information that was entered by a user and/or stored on the control device as arguments (e.g., one or more arguments) to the API.

In some implementations, as shown in FIG. 3A and by reference number 305, the remote server may transmit URLs (and/or other similar Internet locators) associated with corresponding webpages to the control device. The webpages may include information to be associated with different beacons. For example, a first URL may be associated with a webpage to perform a check-in procedure, a second URL may be associated with a webpage that includes first information (e.g., a first menu), a third URL may be associated with a webpage that includes second information (e.g., a second menu), and so on (e.g., as described in connection with FIGS. 1A-1G).

Accordingly, the control device may map the URLs to different BLE sensors configured by the control device. Therefore, as shown by reference number 310, the control device may transmit BLE IDs (and/or payloads), associated with the BLE sensors, to the remote server. Accordingly, the remote server may store the BLE IDs in association with the URLs in order to map a BLE ID to a corresponding URL. As a result, a user device may trigger events (and/or track a location of the user device) by communicating BLE IDs to the remote server.

As indicated above, FIGS. 3A-3B are provided as an example. Other examples may differ from what is described with regard to FIGS. 3A-3B.

Figure 4A:
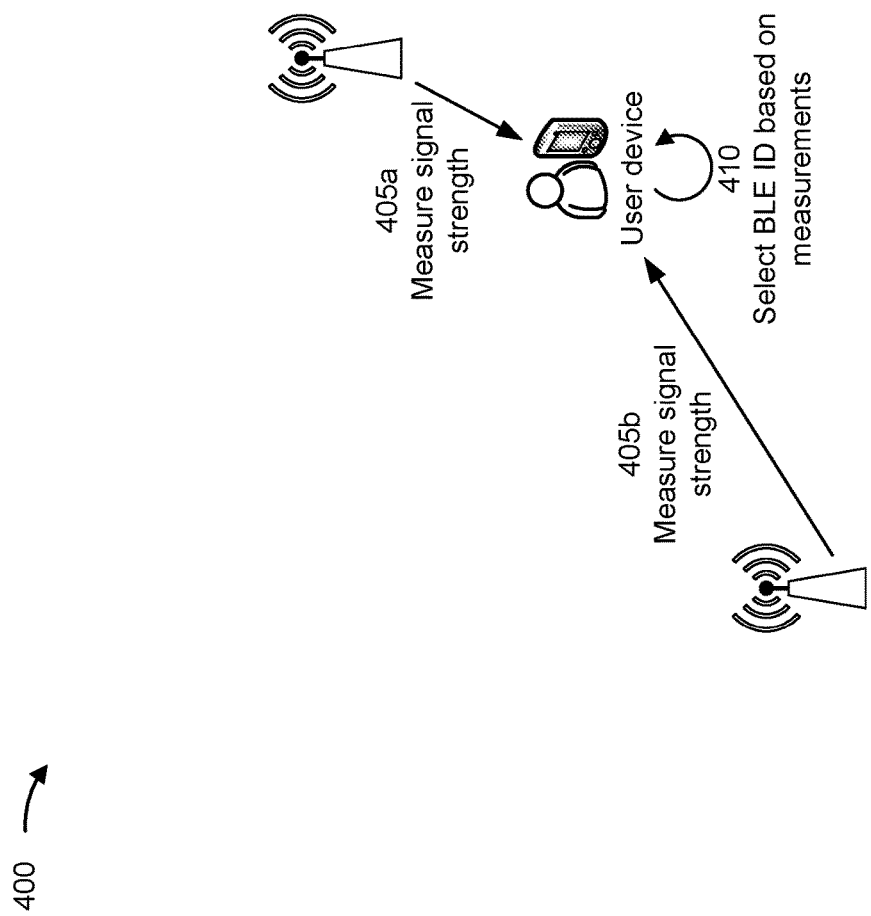
FIGS. 4A-4B are diagrams of an example implementation relating to payload processing for location-based information delivery using Bluetooth beacons, in accordance with some embodiments of the present disclosure.
Figure 4B:
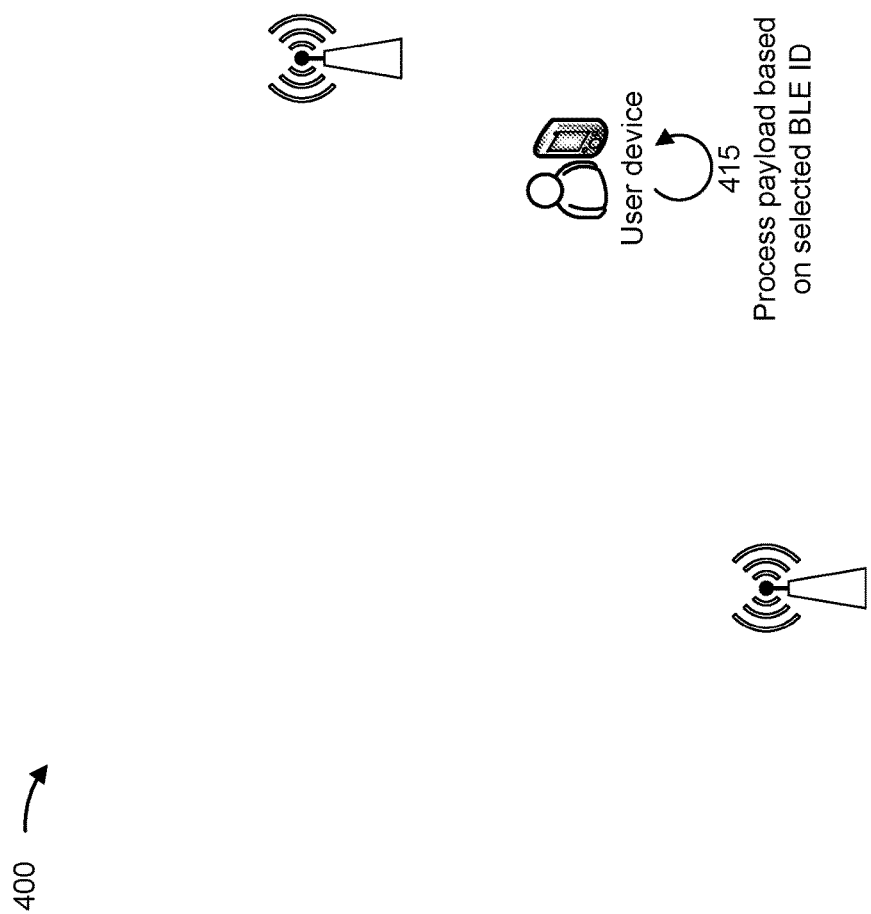

FIGS. 4A-4B are diagrams of an example 400 associated with payload processing for location-based information delivery using Bluetooth beacons. As shown in FIGS. 4A-4B, example 400 includes a plurality of BLE sensors and a user device. These devices are described in more detail in connection with FIGS. 5 and 6.

As shown in FIG. 4A and by reference numbers 405a and 405b, the user device may measure signal strengths (e.g., RSRPs and/or other measures of signal strength) associated with Bluetooth advertisements broadcast by nearby BLE sensors (and/or other similar beacons). Accordingly, as shown by reference number 410, the user device may determine which BLE ID to select based on the signal strengths. For example, the user device may select the BLE ID associated with a highest signal strength and/or associated with a direction of movement of the user device (e.g., based on an increasing, or fastest increasing, signal strength). Selecting the BLE ID to use allows for the user device to determine when to perform a check-in procedure, request first information, or request second information, among other examples (e.g., as described in connection with FIGS. 1A-1G).

Additionally, or alternatively, and as shown in FIG. 4B and by reference number 415, the user device may select which data payload, of the Bluetooth advertisements, to decode based on the signal strengths. For example, the user device may select the BLE ID associated with a highest signal strength and/or associated with a direction of movement of the user device (e.g., based on an increasing, or fastest increasing, signal strength). Selecting the data payload to decode allows for the user device to perform a check-in procedure, request first information, or request second information, among other examples, based on the decoded data payload (e.g., as described in connection with FIGS. 1A-1G).

As indicated above, FIGS. 4A-4B are provided as an example. Other examples may differ from what is described with regard to FIGS. 4A-4B.

Figure 5:
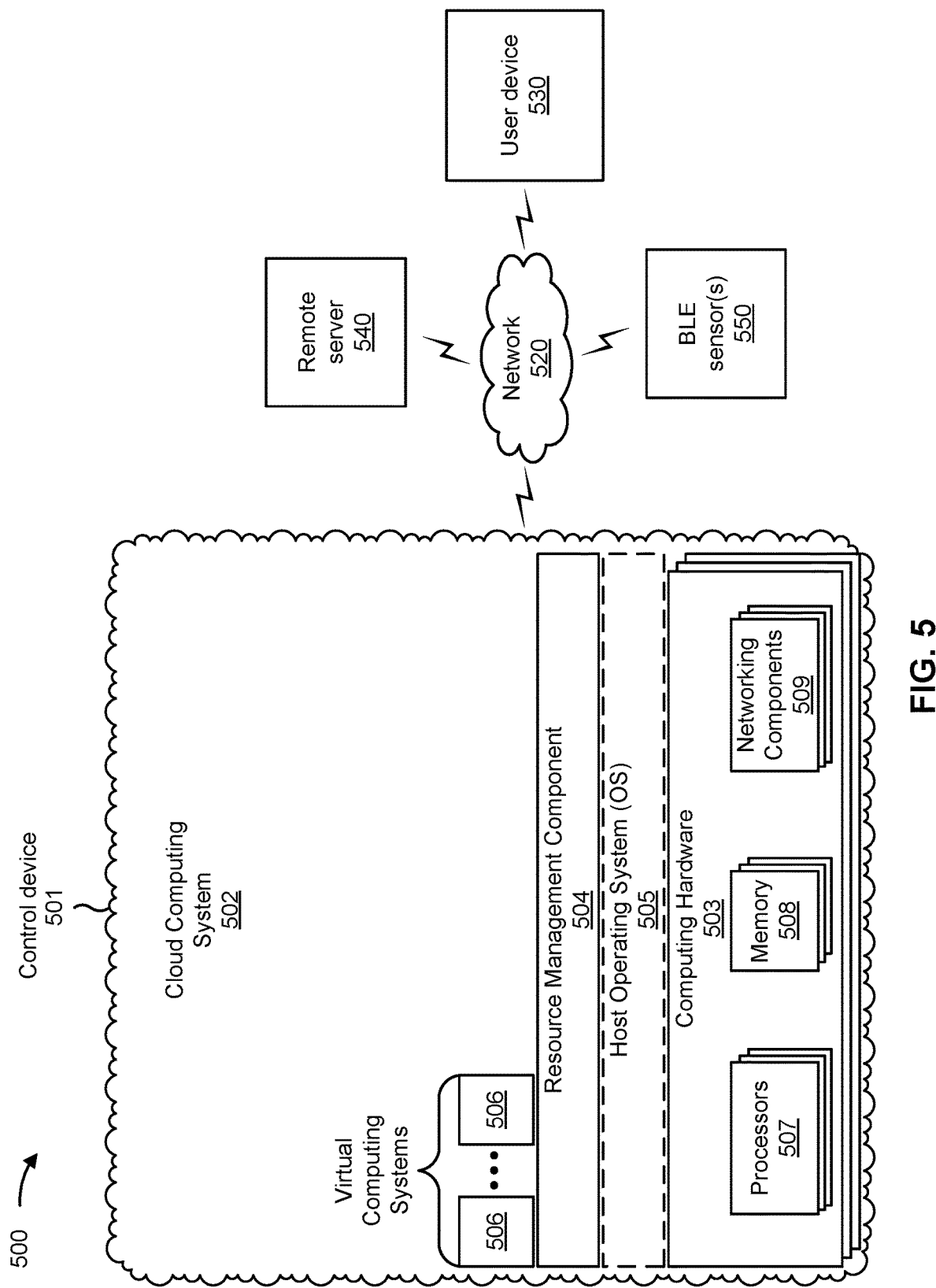
FIG. 5 is a diagram of an example environment in which systems and/or methods described herein may be implemented, in accordance with some embodiments of the present disclosure.

FIG. 5 is a diagram of an example environment 500 in which systems and/or methods described herein may be implemented. As shown in FIG. 5, environment 500 may include a control device 501, which may include one or more elements of and/or may execute within a cloud computing system 502. The cloud computing system 502 may include one or more elements 503-506, as described in more detail below. As further shown in FIG. 5, environment 500 may include a network 520, a user device 530, a remote server 540, and/or one or more BLE sensors 550. Devices and/or elements of environment 500 may interconnect via wired connections and/or wireless connections.

The cloud computing system 502 includes computing hardware 503, a resource management component 504, a host OS 505, and/or one or more virtual computing systems 506. The cloud computing system 502 may execute on, for example, an Amazon Web Services platform, a Microsoft Azure platform, or a Snowflake platform. The resource management component 504 may perform virtualization (e.g., abstraction) of computing hardware 503 to create the one or more virtual computing systems 506. Using virtualization, the resource management component 504 enables a single computing device (e.g., a computer or a server) to operate like multiple computing devices, such as by creating multiple isolated virtual computing systems 506 from computing hardware 503 of the single computing device. In this way, computing hardware 503 can operate more efficiently, with lower power consumption, higher reliability, higher availability, higher utilization, greater flexibility, and lower cost than using separate computing devices.

Computing hardware 503 includes hardware and corresponding resources from one or more computing devices. For example, computing hardware 503 may include hardware from a single computing device (e.g., a single server) or from multiple computing devices (e.g., multiple servers), such as multiple computing devices in one or more data centers. As shown, computing hardware 503 may include one or more processors 507, one or more memories 508, and/or one or more networking components 509. Examples of a processor, a memory, and a networking component (e.g., a communication component) are described elsewhere herein.

The resource management component 504 includes a virtualization application (e.g., executing on hardware, such as computing hardware 503) capable of virtualizing computing hardware 503 to start, stop, and/or manage one or more virtual computing systems 506. For example, the resource management component 504 may include a hypervisor (e.g., a bare-metal or Type 1 hypervisor, a hosted or Type 2 hypervisor, or another type of hypervisor) or a virtual machine monitor, such as when the virtual computing systems 506 are virtual machines. Additionally, or alternatively, the resource management component 504 may include a container manager, such as when the virtual computing systems 506 are containers. In some implementations, the resource management component 504 executes within and/or in coordination with a host operating system 505.

A virtual computing system 506 includes a virtual environment that enables cloud-based execution of operations and/or processes described herein using computing hardware 503. As shown, a virtual computing system 506 may include a virtual machine, a container, or a hybrid environment that includes a virtual machine and a container, among other examples. A virtual computing system 506 may execute one or more applications using a file system that includes binary files, software libraries, and/or other resources required to execute applications on a guest operating system (e.g., within the virtual computing system 506) or the host operating system 505.

Although the control device 501 may include one or more elements 503-506 of the cloud computing system 502, may execute within the cloud computing system 502, and/or may be hosted within the cloud computing system 502, in some implementations, the control device 501 may not be cloud-based (e.g., may be implemented outside of a cloud computing system) or may be partially cloud-based. For example, the control device 501 may include one or more devices that are not part of the cloud computing system 502, such as device 600 of FIG. 6, which may include a stand-alone server or another type of computing device. The control device 501 may perform one or more operations and/or processes described in more detail elsewhere herein.

Network 520 includes one or more wired and/or wireless networks. For example, network 520 may include a cellular network, a public land mobile network (PLMN), a local area network (LAN), a wide area network (WAN), a private network, the Internet, and/or a combination of these or other types of networks. The network 520 enables communication among the devices of environment 500.

The user device 530 includes one or more devices capable of receiving, generating, storing, processing, and/or providing information associated with wayfinding and location-based information delivery using Bluetooth beacons, as described elsewhere herein. The user device 530 may include a communication device and/or a computing device. For example, the user device 530 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The remote server 540 includes one or more devices capable of receiving, generating, storing, processing, providing, and/or routing information associated with wayfinding and location-based information delivery using Bluetooth beacons, as described elsewhere herein. The remote server 540 may include a communication device and/or a computing device. For example, the remote server 540 may include a server, such as an application server, a client server, a web server, a database server, a host server, a proxy server, a virtual server (e.g., executing on computing hardware), or a server in a cloud computing system. In some implementations, the remote server 540 includes computing hardware used in a cloud computing environment.

The BLE sensor(s) 550 include one or more devices capable of transmitting Bluetooth beacons (such as advertisements) for wayfinding and location-based information delivery, as described elsewhere herein. The BLE sensor(s) 550 may include low-power devices (e.g., with an internal battery, a transmitter, and a controller programmed to, or otherwise configured to, instruct the transmitter to transmit the Bluetooth beacons). In some implementations, the BLE sensor(s) 550 may communicate (e.g., over a wired connection or using wireless signals) with the control device 501.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of environment 500 may perform one or more functions described as being performed by another set of devices of environment 500.

Figure 6:
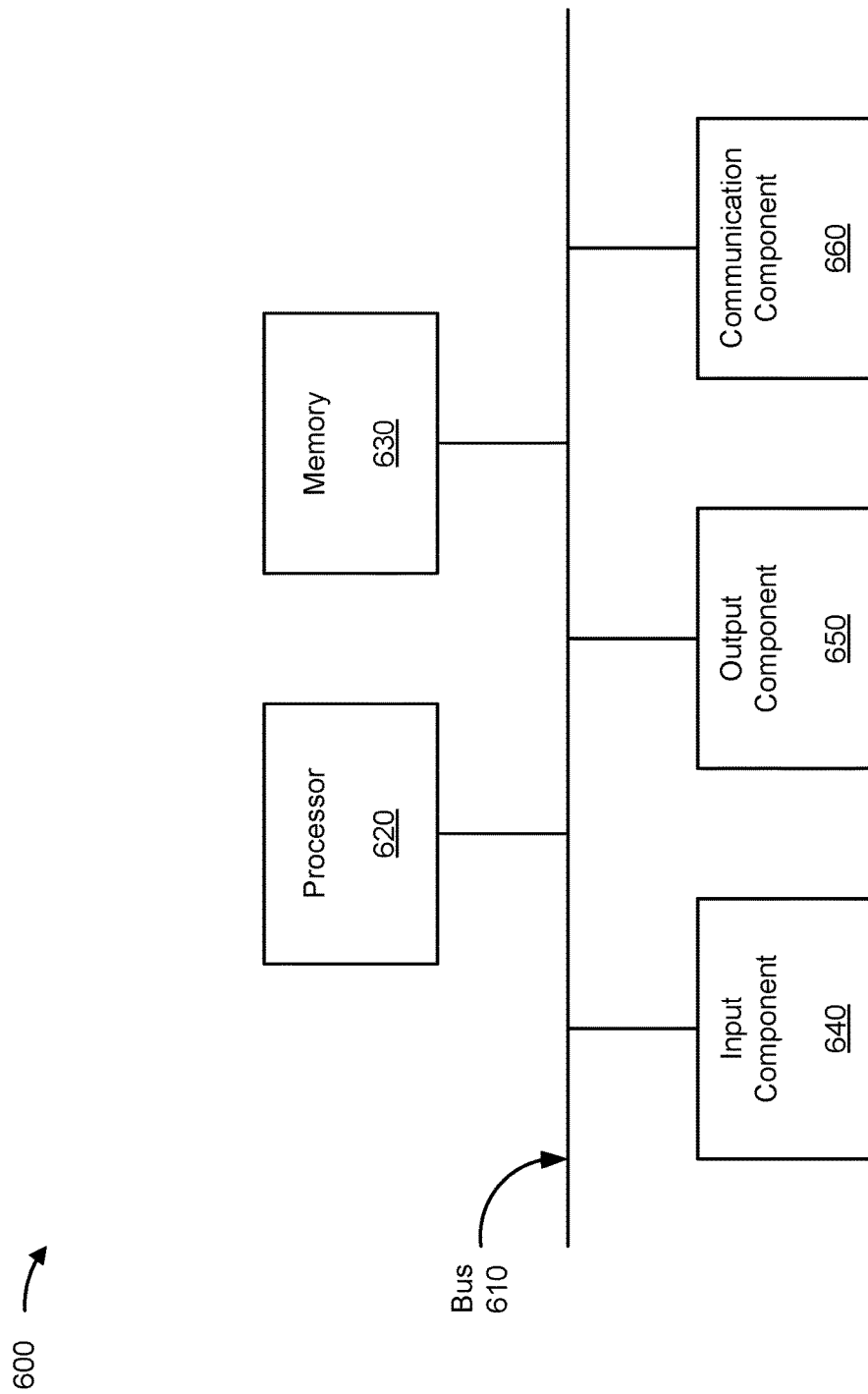
FIG. 6 is a diagram of example components of one or more devices of FIG. 5, in accordance with some embodiments of the present disclosure.

FIG. 6 is a diagram of example components of a device 600, which may correspond to a user device, a remote server, and/or one or more BLE sensors. In some implementations, the user device, the remote server, and/or the BLE sensor(s) may include one or more devices 600 and/or one or more components of device 600. As shown in FIG. 6, device 600 may include a bus 610, a processor 620, a memory 630, an input component 640, an output component 650, and a communication component 660.

Bus 610 includes one or more components that enable wired and/or wireless communication among the components of device 600. Bus 610 may couple together two or more components of FIG. 6, such as via operative coupling, communicative coupling, electronic coupling, and/or electric coupling. Processor 620 includes a central processing unit, a graphics processing unit, a microprocessor, a controller, a microcontroller, a digital signal processor, a field-programmable gate array, an application-specific integrated circuit, and/or another type of processing component. Processor 620 is implemented in hardware, firmware, or a combination of hardware and software. In some implementations, processor 620 includes one or more processors capable of being programmed to perform one or more operations or processes described elsewhere herein.

Memory 630 includes volatile and/or nonvolatile memory. For example, memory 630 may include random access memory (RAM), read only memory (ROM), a hard disk drive, and/or another type of memory (e.g., a flash memory, a magnetic memory, and/or an optical memory). Memory 630 may include internal memory (e.g., RAM, ROM, or a hard disk drive) and/or removable memory (e.g., removable via a universal serial bus connection). Memory 630 may be a non-transitory computer-readable medium. Memory 630 stores information, instructions, and/or software (e.g., one or more software applications) related to the operation of device 600. In some implementations, memory 630 includes one or more memories that are coupled to one or more processors (e.g., processor 620), such as via bus 610.

Input component 640 enables device 600 to receive input, such as user input and/or sensed input. For example, input component 640 may include a touch screen, a keyboard, a keypad, a mouse, a button, a microphone, a switch, a sensor, a global positioning system sensor, an accelerometer, a gyroscope, and/or an actuator. Output component 650 enables device 600 to provide output, such as via a display, a speaker, and/or a light-emitting diode. Communication component 660 enables device 600 to communicate with other devices via a wired connection and/or a wireless connection. For example, communication component 660 may include a receiver, a transmitter, a transceiver, a modem, a network interface card, and/or an antenna.

Device 600 may perform one or more operations or processes described herein. For example, a non-transitory computer-readable medium (e.g., memory 630) may store a set of instructions (e.g., one or more instructions or code) for execution by processor 620. Processor 620 may execute the set of instructions to perform one or more operations or processes described herein. In some implementations, execution of the set of instructions, by one or more processors 620, causes the one or more processors 620 and/or the device 600 to perform one or more operations or processes described herein. In some implementations, hardwired circuitry is used instead of or in combination with the instructions to perform one or more operations or processes described herein. Additionally, or alternatively, processor 620 may be configured to perform one or more operations or processes described herein. Thus, implementations described herein are not limited to any specific combination of hardware circuitry and software.

The number and arrangement of components shown in FIG. 6 are provided as an example. Device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

Figure 7:
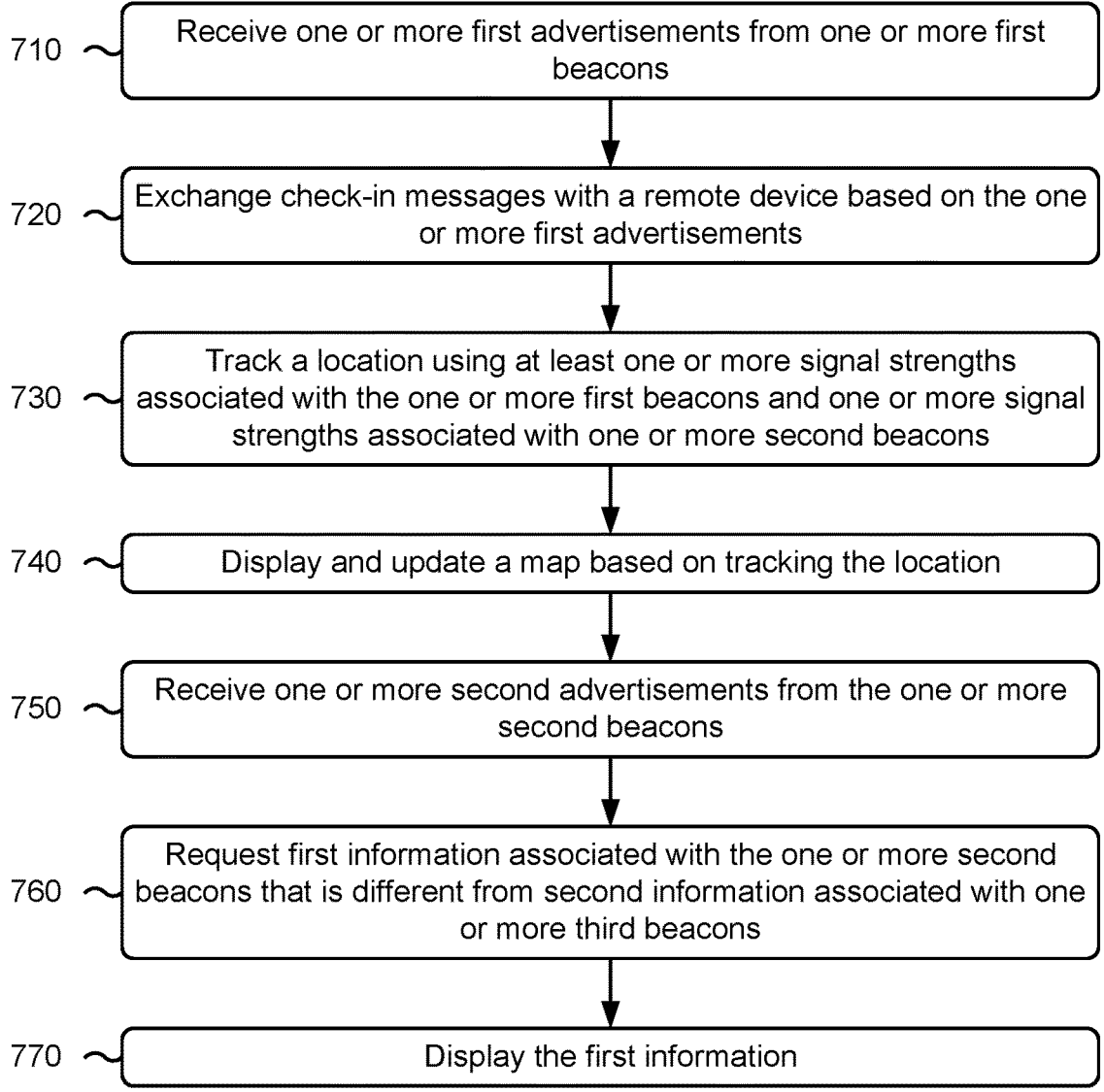
FIG. 7 is a flowchart of an example process relating to wayfinding and location-based information delivery using Bluetooth beacons, in accordance with some embodiments of the present disclosure.

FIG. 7 is a flowchart of an example process 700 associated with wayfinding and location-based information delivery using Bluetooth beacons. In some implementations, one or more process blocks of FIG. 7 may be performed by the user device 530. In some implementations, one or more process blocks of FIG. 7 may be performed by another device or a group of devices separate from or including the user device 530, such as the control device 501, the remote server 540, and/or the BLE sensor(s) 550. Additionally, or alternatively, one or more process blocks of FIG. 7 may be performed by one or more components of the device 600, such as processor 620, memory 630, input component 640, output component 650, and/or communication component 660.

As shown in FIG. 7, process 700 may include receiving one or more first advertisements from one or more first beacons (block 710). For example, the user device 530 (e.g., using processor 620, memory 630, input component 640, and/or communication component 660) may receive one or more first advertisements from one or more first beacons, as described above in connection with reference number 115 of FIG. 1B. As an example, the user device may decode a BLE ID (and/or a data payload) associated with the first advertisement(s) from the first beacon(s).

As further shown in FIG. 7, process 700 may include exchanging check-in messages with a remote device based on the one or more first advertisements (block 720). For example, the user device 530 (e.g., using processor 620 and/or memory 630) may exchange check-in messages with a remote device based on the one or more first advertisements, as described above in connection with reference numbers 120a and 120b of FIG. 1B. As an example, the user device may transmit an initial location, associated with a user, based on a signal strength associated with the first beacon(s) and may receive a confirmation indicating that the user may proceed.

As further shown in FIG. 7, process 700 may include tracking a location using at least one or more signal strengths associated with the one or more first beacons and one or more signal strengths associated with one or more second beacons (block 730). For example, the user device 530 (e.g., using processor 620 and/or memory 630) may track a location using at least one or more signal strengths associated with the one or more first beacons and one or more signal strengths associated with one or more second beacons, as described above in connection with reference numbers 135a and 135b of FIG. 1D. As an example, the user device may periodically determine RSRPs (and/or other measures of signal strength) associated with the first beacon(s) and the second beacon(s) in order to periodically update a location of the user device (e.g., based on times-of-flight and incident directions for the first advertisement(s) and second advertisement(s) and/or based on trilateration, multilateration, or triangulation using the first advertisement(s) and the second advertisement(s)).

As further shown in FIG. 7, process 700 may include displaying and updating a map based on tracking the location (block 740). For example, the user device 530 (e.g., using processor 620, memory 630, and/or output component 650) may display and update a map based on tracking the location, as described above in connection with reference numbers 135a and 135b of FIG. 1D. As an example, the user device may shift a focal point of the map to follow a direction of the user device. Additionally, or alternatively, the user device may move a visual indicator of the user on the map as the location is tracked.

As further shown in FIG. 7, process 700 may include receiving one or more second advertisements from the one or more second beacons (block 750). For example, the user device 530 (e.g., using processor 620, memory 630, input component 640, and/or communication component 660) may receive one or more second advertisements from the one or more second beacons, as described above in connection with reference number 140 of FIG. 1E. As an example, the user device may decode a BLE ID (and/or a data payload) associated with the second advertisement(s) from the second beacon(s).

As further shown in FIG. 7, process 700 may include requesting first information associated with the one or more second beacons that is different from second information associated with one or more third beacons (block 760). For example, the user device 530 (e.g., using processor 620 and/or memory 630) may request first information associated with the one or more second beacons that is different from second information associated with one or more third beacons, as described above in connection with reference numbers 145a and 145b of FIG. 1E. As an example, the user device may determine one or more signal strengths associated with the second advertisement(s) and transmit a request for the first information associated with the second beacon(s) when the one or more signal strengths satisfy one or more strength thresholds.

As further shown in FIG. 7, process 700 may include displaying the first information (block 770). For example, the user device 530 (e.g., using processor 620, memory 630, and/or output component 650) may display the first information, as described above in connection with reference numbers 145a and 145b of FIG. 1E. As an example, the user device may use a URL (and/or another locator), either included in one or more payloads of the second advertisement(s) or otherwise associated with the second advertisement(s), to navigate to a webpage (e.g., using a mobile browser executed on the user device) that includes the first information. In some implementations, the user device may use a browser plug-in within a mobile application to navigate to the webpage using the URL.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel. The process 700 is an example of one process that may be performed by one or more devices described herein. These one or more devices may perform one or more other processes based on operations described herein, such as the operations described in connection with FIGS. 1A-1G, FIGS. 2A-2B, and/or FIGS. 3A-3B. Moreover, while the process 700 has been described in relation to the devices and components of the preceding figures, the process 700 can be performed using alternative, additional, or fewer devices and/or components. Thus, the process 700 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for beacon-based wayfinding and location-based information delivery, the system comprising:
   one or more memories; and
   one or more processors, communicatively coupled to the one or more memories, configured to:
      receive one or more first advertisements from one or more first beacons;
      exchange check-in messages with a remote device based on the one or more first advertisements;
      track a location using at least one or more signal strengths associated with the one or more first beacons and one or more signal strengths associated with one or more second beacons;
      display and update a map based on tracking the location;
      receive one or more second advertisements from the one or more second beacons;
      request first information associated with the one or more second beacons that is different from second information associated with one or more third beacons; and
      display the first information.

2. The system of claim 1, wherein the one or more processors are further configured to:
   transmit a selection of one or more items from the first information;
   receive a summary associated with the one or more items; and
   perform a transaction based on the summary.

3. The system of claim 1, wherein the one or more processors, to exchange the check-in messages, are configured to:
   transmit an initial location associated with a user based on the one or more signal strengths associated with the one or more first beacons; and
   receive a confirmation indicating that the user may proceed.

4. The system of claim 3, wherein the one or more processors are further configured to:
   receive an instruction to proceed toward the one or more third beacons before receiving the confirmation;

request the second information associated with the one or more third beacons; and display the second information.

5. The system of claim 1, wherein the one or more processors, to track the location, are configured to:

determine, periodically, the one or more signal strengths associated with the one or more first beacons, the one or more signal strengths associated with the one or more second beacons, or a combination thereof; and update, periodically, the location based on a data structure indicating locations of the one or more first beacons and the one or more second beacons.

6. The system of claim 1, wherein the one or more processors are further configured to:

transmit a registration message; and receive a data structure tying the first information to the one or more second advertisements and the second information to one or more third advertisements.

7. The system of claim 1, wherein the first information is requested based on a uniform resource locator (URL) encoded in the one or more second advertisements.

8. A method of beacon-based wayfinding and location-based information delivery, comprising:

receiving one or more first advertisements from one or more first beacons;

exchanging check-in messages with a remote device based on the one or more first advertisements;

receiving one or more second advertisements from one or more second beacons;

requesting first information associated with the one or more second beacons that is different from second information associated with one or more third beacons; and displaying the first information.

9. The method of claim 8, wherein the one or more first advertisements and the one or more second advertisements are Bluetooth Low Energy advertisements.

10. The method of claim 8, wherein the remote device includes an on-site computing system.

11. The method of claim 8, wherein the remote device includes a remote server accessed through an application layer.

12. The method of claim 8, wherein the first information includes a first list of one or more items associated with a first region, and the second information includes a second list of one or more items associated with a second region.

13. The method of claim 8, wherein displaying the first information comprises:

launching a browser plug-in within a mobile application configured to process the one or more first advertisements and the one or more second advertisements; and retrieving the first information using the browser plug-in.

14. The method of claim 8, wherein the check-in messages are exchanged based on one or more signal strengths associated with the one or more first advertisements satisfying one or more strength thresholds.

15. A non-transitory computer-readable medium storing a set of instructions for beacon-based wayfinding and location-based information delivery, the set of instructions comprising:

one or more instructions that, when executed by one or more processors of a device, cause the device to:

receive one or more first advertisements from one or more first beacons;

request first information associated with the one or more first beacons that is different from second information associated with one or more second beacons;

display the first information;

transmit a first location based on one or more signal strengths associated with the one or more first beacons;

receive a check-in message from a remote device based on the first location;

receive one or more second advertisements from the one or more second beacons;

request the second information associated with the one or more second beacons, based on a second location based on one or more signal strengths associated with the one or more second beacons; and display the second information.

16. The non-transitory computer-readable medium of claim 15, wherein the one or more instructions, when executed by the one or more processors, further cause the device to:

transmit a selection of one or more first items from the first information;

transmit a selection of one or more second items from the second information;

receive a summary associated with the one or more first items and the one or more second items; and perform a transaction based on the summary.

17. The non-transitory computer-readable medium of claim 15, wherein the first location and the second location are determined with an accuracy of 5 meters or less.

18. The non-transitory computer-readable medium of claim 15, wherein the first location and the second location are within a same building.

19. The non-transitory computer-readable medium of claim 15, wherein the one or more instructions, when executed by the one or more processors, further cause the device to:

receive one or more additional advertisements; and discard the one or more additional advertisements based on one or more identifiers of one or more beacons broadcasting the one or more additional advertisements not being including in a stored data structure.

20. The non-transitory computer-readable medium of claim 15, wherein the one or more instructions, that cause the device to receive the check-in message, cause the device to:

receive instructions to proceed to the second location from the first location.

* * * * *